Nov. 18, 1930.  H. CRAGG  1,782,290
OSCILLATING HEADLIGHT FOR AUTOMOBILES
Filed Sept. 26, 1929   2 Sheets-Sheet 1
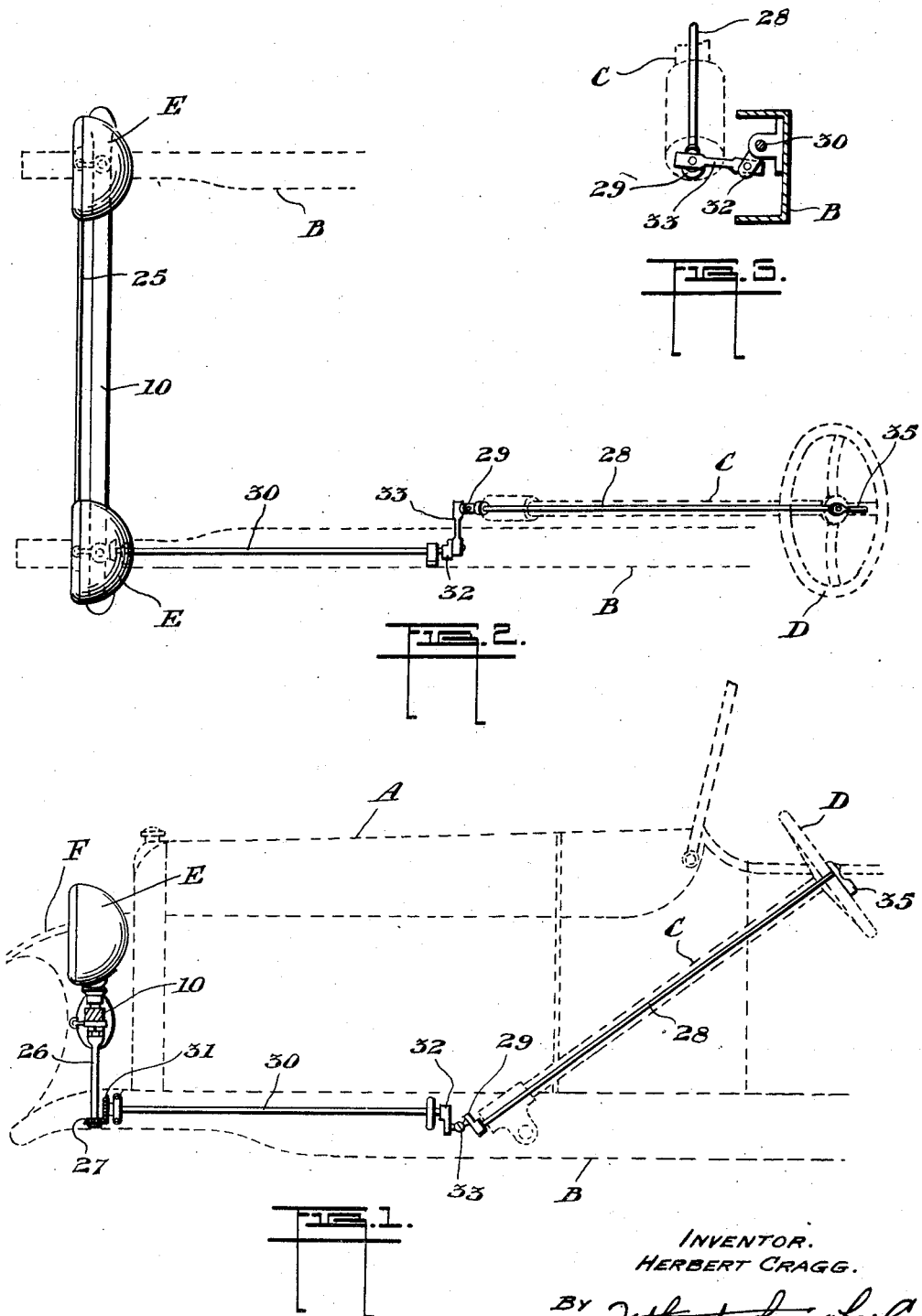
INVENTOR.
HERBERT CRAGG.
BY Featherstonhaugh & Co.
ATT'YS.

Nov. 18, 1930.   H. CRAGG   1,782,290
OSCILLATING HEADLIGHT FOR AUTOMOBILES
Filed Sept. 26, 1929   2 Sheets-Sheet 2
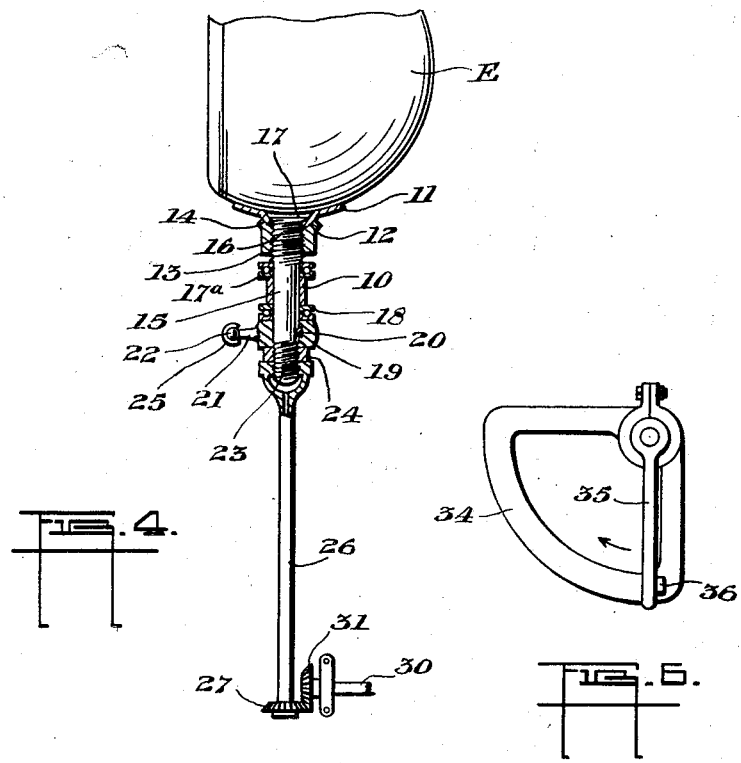
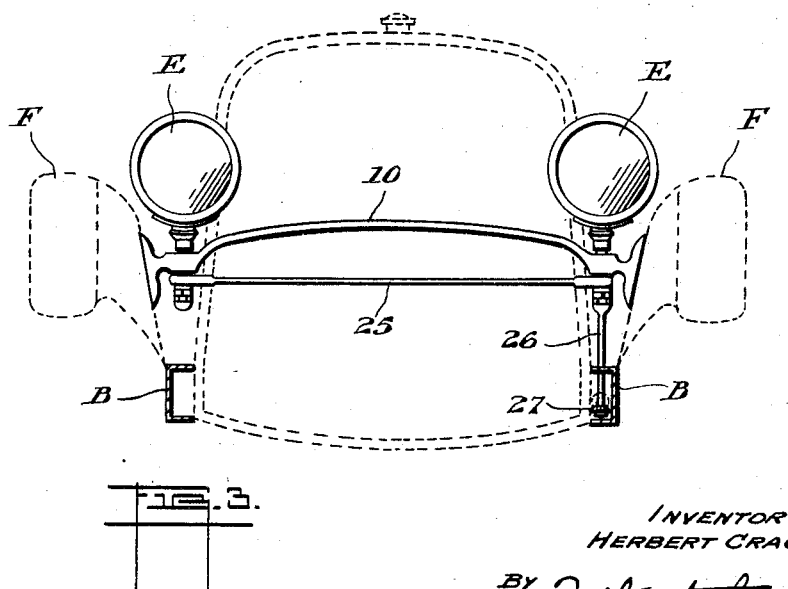
INVENTOR.
HERBERT CRAGG.
BY Fetherstonhaugh & Co.
ATT'YS.

Patented Nov. 18, 1930

1,782,290

UNITED STATES PATENT OFFICE

HERBERT CRAGG, OF OTTAWA, ONTARIO, CANADA

OSCILLATING HEADLIGHT FOR AUTOMOBILES

Application filed September 26, 1929. Serial No. 395,428.

This invention relates to improvements in oscillating headlights for automobiles and the object of the invention is to provide an improved manner of mounting and oscillating the headlights of an automobile whereby greater safety in night driving may result.

A further object is to provide for the elimination of glare caused to the drivers of two approaching vehicles and more especially to provide for the simultaneous oscillation of the two headlights through arcs on one side only of their dead-ahead position so that, when two vehicles are approaching, the headlights may be thus oscillated to direct the rays thereof towards the near side of the road and away from the approaching vehicle.

A further object is to provide an improved illumination of the near side of the road during the time the vehicles are approaching and passing each other.

A further object is to provide for this oscillation of the headlights through arcs on one side only of their dead-ahead position and to positively prevent oscillation on the other side of their dead-ahead position.

A further object is to provide the invention in a simple and inexpensive form which may be readily applied to any automobile and the operation of which may be very simply performed by the driver by means quite separate and distinct from the actual steering mechanism and in which the oscillation of the headlights is quite independent of any lateral inclination of the front wheels of the vehicle.

The invention consists in the construction and arrangement, all as hereinafter more particularly described, and illustrated in the accompanying drawings in which, Figure 1 is a diagrammatic side elevation of the improved apparatus applied to an automobile, the automobile being indicated in broken lines.

Figure 2 is a plan view thereof.

Figure 3 is a front end view of the apparatus applied to an automobile, the automobile itself being indicated in broken lines.

Figure 4 is a vertical section through one of the headlights mounted in accordance with the present invention, partly in section.

Figure 5 is a fragmentary detail showing a manner of operating the device at the lower end of the steering column.

Figure 6 is a detached top plan view of a lever for operating the device and a quadrant associated therewith.

In the drawings like characters of reference indicate corresponding parts in the different views.

In the form of the invention illustrated an automobile is indicated by the letter A, the chassis frame thereof by the letter B, the steering column by the letter C, the steering wheel by the letter D, the headlights by the letter E, and the mudguards by the letter F.

According to the embodiment of the invention illustrated a stationary member 10 extends across the front of the automobile from which member the headlights E are supported. Each headlight E has secured thereto at the bottom thereof a member 11 which is formed with a spherical seat 12 and associated therewith is a lock-nut 13 which is formed with a spherical seat 14 adapted to accommodate the spherical seat 12. A spindle 15, threaded at its upper end at 16 and having an enlarged head 17, extends downwardly through the spherical seat 12 and the lock-nut 13, the lock-nut having threaded engagement upon the threaded portion 16 of this spindle.

Each spindle 15 is journalled within the cross member 10 and mounted thereon above and below the cross member are ball-thrust bearings 17ª and 18. Below the bearing 18 each spindle 15 has mounted thereon a collar 19 secured against rotation on the spindle by a key 20 and each spindle has projecting therefrom an arm 21 having a ball end 22 the purpose of which will be presently explained. The lower end of each spindle 15 is threaded at 23 and mounted thereon is a lock-nut 24.

Connecting the arms 21 of the collars 19 is a distance rod 25 which has ball and socket connection with the balls 22, this distance rod being of such length that the two headlights will be directed in their dead-ahead position simultaneously.

Connected to the lower threaded end 23 of one of the spindles 15 is a depending arm 26 which extends downwardly through the chassis frame B and carries at its lower end a pinion 27. Extending downwardly through the steering column C is a rod 28 the lower end of which carries a crank 29.

Journalled within the frame B is a shaft 30 which carries at one end a pinion 31 meshing with the pinion 27 and carries at its other end a crank 32. The cranks 29 and 32 are connected through a connection 33.

Mounted upon the upper end of the steering column is a quadrant 34 and secured to the upper end of the rod 28 is a lever 35 by means of which the rod 28 may be turned axially. The quadrant 34 is formed with a stop 36 which limits the movement of the lever 35 in one direction.

It will be evident from the foregoing that by means of the lever 35 the headlights E may be oscillated about vertical axes as when this lever is moved the rod 28 is turned and through the cranks 29 and 32 and the connection 33 the shaft 30 is turned which causes rotation of the pinions 31 and 27 and the arm 26 which causes turning of the spindle 15 to turn the headlight; the other headlight being simultaneously turned due to the connection established between the headlights by the distance rod 25.

The parts are so arranged that when the lever 35 is in engagement with the stop 36 the headlights will be in their dead-ahead position, as illustrated in Figure 2, and movement of the lever 35 in the direction of the arrow in Figure 6 will turn the headlights to the right but it will be impossible to turn them to the left beyond their dead-ahead position.

The manner of mounting the headlights as described provides for a secure mounting and also by means of the lock-nuts the degree of tension in the mounting may be adjusted as desired.

The headlights are secured to the spindles 15 by tightening the lock-nuts 13 which draw the enlarged heads 17 downwardly so that the spherical seat 12 is pressed against the spherical seat 14.

As is well known many attempts have been made to eliminate the objectionable glare caused to the drivers of approaching vehicles and in the present instance a very effective means of accomplishing this end has been obtained.

In ordinary driving the headlights would be in their dead-ahead position and upon approaching a vehicle the driver would simply oscillate the headlights towards the near side of the road and this would accomplish a double result of removing the objectionable glare from the eyes of the approaching driver and would also very greatly improve the illumination of the near side of the road since the headlights would be turned in that direction.

The manner of operating the headlights is entirely manual and is entirely independent of the steering mechanism.

Furthermore, the invention provides a means for oscillating the headlights through arcs on the near side only of their dead-ahead position and provides means for positively preventing oscillation of the headlights on the other side of their dead-ahead position which would be very undesirable.

While I have illustrated one particular manner of operating the headlights it is of course obvious that other equivalent means might be employed.

The invention is of course equally applicable to countries in which driving is done on the left hand side of the road as to those in which it is done on the right hand side. In the former instances the headlights will be constrained to oscillate on the left hand side of their dead-ahead position whereas in the latter case they will be constrained to oscillate on the right hand side of their dead-ahead position.

From the foregoing it will be apparent that the invention provides an improved apparatus of the type described whereby the objects set forth have been attained.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claim.

What I claim as my invention is:—

The combination with the headlights of an automobile, of spindles secured to the bottoms thereof, projections on said spindles and a tie rod joining said projections, an arm secured to and depending from one of said spindles and having a pinion secured at the bottom thereof, a shaft mounted on the chassis frame of the automobile and having a pinion secured at one end thereof meshing with said first mentioned pinion, said shaft having a crank connection with a shaft on the steering column of the automobile and means for permitting rotation of said last mentioned shaft to one side only of the position it assumes when said automobile headlights are at dead center.

In witness whereof I have hereunto set my hand.

HERBERT CRAGG.